June 2, 1942.　　H. SCOTT-PAINE　　2,284,881
TORPEDO TUBE
Filed June 14, 1940
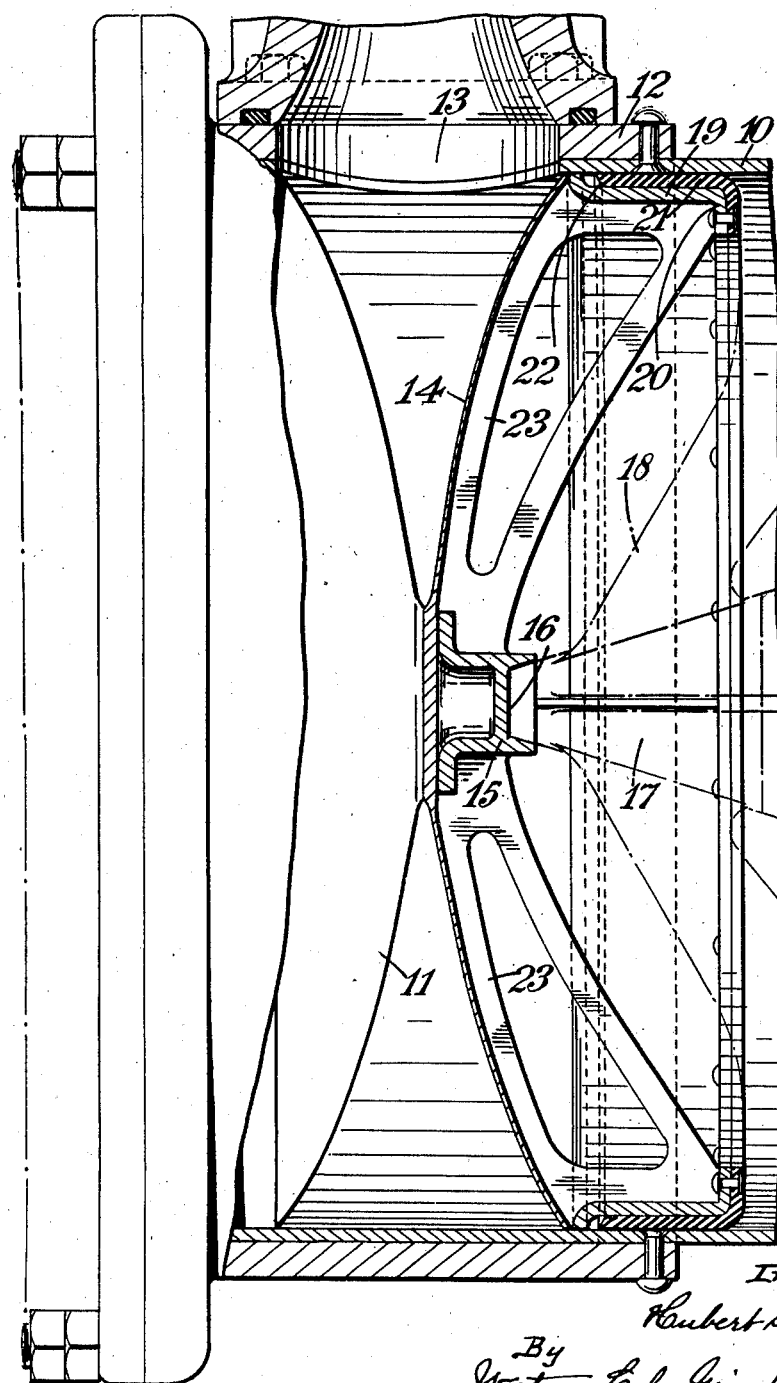
Inventor
Hubert Scott-Paine
By
Watson, Cole, Grindle & Watson
Attorneys Patented June 2, 1942

2,284,881

UNITED STATES PATENT OFFICE 2,284,881

TORPEDO TUBE

Hubert Scott-Paine, Hythe, Southampton, England

Application June 14, 1940, Serial No. 340,588
In Great Britain June 16, 1939

2 Claims. (Cl. 114—238)

This invention concerns improvements in or relating to torpedo tubes and has for its object to provide an improved construction of piston which can be used at the rear end of a torpedo to transmit the pressure of the propellent gas to it and effect its discharge. One advantage of the use of such a piston is that owing to the tapering shape of the rear end of a torpedo, there is a comparatively large volume of the tube which has to be filled with the propellent gas before the maximum pressure is exerted on the torpedo, whereas by the provision of a piston at the rear end of the torpedo this waste or clearance volume is diminished.

In the ordinary construction of torpedo, it is conical at its rear end, the shell terminating in a boss which may be hollow and being provided with fin-brackets, usually four in number, which extend radially at the rear end to about the maximum overall diameter of the torpedo.

According to this invention, there is provided for use in a torpedo tube, a piston comprising in combination a central boss to engage the casing of the torpedo, circumferentially disposed abutments to engage the fin-brackets of the torpedo, and a crown or disc whereon they are all mounted, which crown is sufficiently flexible to ensure that the propulsive effort exerted by the piston is applied to all the available points on the torpedo, that is to say on the central boss and on the various fin-brackets.

According to another features of this invention, the flexible crown aforesaid is of a dome shape so as to present a convex face to the gas pressure operative on it; this doming of the piston towards the inner end of the torpedo tube where the gases are generated or admitted, reduces the clearance volume which has to be filled by the gases, and furthermore it provides a construction in which adequate strength is easily obtained together with necessary flexibility.

According to yet another feature of the invention, a piston as aforesaid may be provided with a peripheral flange whereon a packing leather is secured, to ensure a gas-tight fit of the piston in the tube.

In the accompanying drawing which illustrates one construction in accordance with this invention, the rear end of a torpedo tube is indicated at 10, this end being closed by any suitable closure member 11. A reinforcing ring 12 surrounds the tube 10 and is provided with an opening 13 to permit the entry of gases produced by the combustion of a propellent charge.

The piston forming the subject of this invention comprises a thin sheet steel disc 14 which is of domed formation and has a central boss 15 secured to it on its concave side by welding, riveting or other suitable means. This boss is shaped at its exposed side 16 to co-operate with the central boss at the rear end of a torpedo indicated in chain lines 17. The torpedo is also provided with radial fin brackets 18.

At the periphery of the disc 14 there is provided a flange 19 which extends axially of the disc and is riveted, welded or otherwise secured to it. The flange 19 is secured on the concave side of the disc, and its free edge 20 is inturned towards the centre of the disc and a strip of leather or like packing material is secured, as by riveting, to this inturned lip and is bent back to lie along the outside of the flange 19 with its free edge 22 near the periphery of the disc. The gas pressure is exerted on the convex side of the disc and therefore enters under the leather in the usual way to press it outward and ensure a gas-tight fit of the piston in the torpedo tube.

The inturned lip 20 on the flange 19 is preferably so positioned as to abut the fin-brackets 18 on the torpedo, and the disc 14 may be made sufficiently strong to transmit the gas pressure to these fin-brackets and the central boss of the torpedo; it is preferred however to provide stiffening ribs 23 which extend radially from the central boss 15 to the flange 19 so as to reinforce the whole piston and enable it to be made of lighter section than would otherwise be possible. These ribs may be provided with lightening holes and any suitable number may be used.

When a torpedo is inserted in the tube 10, the rear closure 11 is opened and the piston put into place between the rear end of the torpedo and the closure member 11 with the convex side facing the closure 11. This closure member may also be domed, as shown, in order to reduce the clearance volume which has to be filled with propellent gas. Since the piston is of light and inexpensive construction it may be discharged with the torpedo, although, if desired, means may be provided for retaining it when the torpedo has been discharged.

A piston as above described may be used with any propellent gas such as is derived from the combustion of cordite or other suitable slow-burning explosive or with compressed air.

I claim:

1. For use in a torpedo tube in cooperation with a torpedo having at its end a central boss and fin-brackets, a piston comprising a flexible sheet-metal disc of domed formation, a central boss secured to the centre of said disc on its concave side and adapted to cooperate with the central boss of the torpedo, and a flange carrying a packing material and secured to the edge of said flexible disc and adapted to fit the inside of the torpedo tube and abut the fin-brackets on the torpedo.

2. A torpedo tube piston as defined in claim 1, which is provided with stiffening ribs extending radially from said central boss to said flange.

HUBERT SCOTT-PAINE.